United States Patent
Manabe et al.

(10) Patent No.: US 6,580,226 B1
(45) Date of Patent: Jun. 17, 2003

(54) FLAT PANEL DISPLAY DEVICE AND METHOD FOR MANUFACTURING THE SAME

(75) Inventors: Atsuyuki Manabe, Fukaya (JP); Takeshi Yamamoto, Fukaya (JP); Hitoshi Hato, Yokohama (JP); Kazuyuki Sunohara, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/711,906

(22) Filed: Nov. 15, 2000

(30) Foreign Application Priority Data

Nov. 15, 1999 (JP) .......................................... 11-324262

(51) Int. Cl.$^7$ ................................................. G09G 3/10
(52) U.S. Cl. ...................... 315/169.4; 349/155; 349/158
(58) Field of Search ........................... 315/169.4, 169.1; 349/33, 43, 155, 158, 156, 56, 61

(56) References Cited

U.S. PATENT DOCUMENTS 5,499,128 A * 3/1996 Hasegawa et al. .......... 349/155
5,719,647 A * 2/1998 Fujikawa et al. ............. 349/40
5,726,728 A * 3/1998 Kondo et al. ............... 349/156

FOREIGN PATENT DOCUMENTS

| JP | 403118518 A | * 5/1991 |
| JP | 11-125826 | 5/1999 |

* cited by examiner

Primary Examiner—Don Wong
Assistant Examiner—Thuy Vinh Tran
(74) Attorney, Agent, or Firm—Pillsbury Winthrop LLP

(57) ABSTRACT

A flat panel display device comprises a pair of substrates facing each other, a spacer, made of photosensitive material, for providing a gap between the pair of substrates, and a display medium arranged in the gap. At least one of the pair of substrates has a lightproof region including a linear portion. The spacer is arranged in the linear portion of the lightproof region. The spacer has a shape a longitudinal axis of which extends along the linear portion and which has a recessed portion narrower than the linear portion.

9 Claims, 4 Drawing Sheets ial. In addition, spacers
FLAT PANEL DISPLAY DEVICE AND METHOD FOR MANUFACTURING THE SAME

CROSS-REFERENCE TO RELATED APPLICATIONS

This application is based upon and claims the benefit of priority from the prior Japanese Patent Application No. 11-324262, filed Nov. 15, 1999, the entire contents of which are incorporated herein by reference.

BACKGROUND OF THE INVENTION

The present invention relates to a flat panel display device, and more particularly to a structure of a columnar spacer for providing a predetermined gap between a pair of substrates, and a method for manufacturing the same.

A flat panel display device, particularly, a liquid crystal display device, has a liquid crystal material interposed between an array substrate and a counter substrate, each having an electrode. To keep the distance between the substrates constant, plastic beads of a uniform particle size, serving as spacers, are distributed between the substrates.

When the liquid crystal display device as described above is formed, spacers distributed on a substrate may form particles contaminating the manufacturing line, resulting in defect of the line or the products. In addition, spacers existing in a pixel area may cause alignment defect. Further, an agglomeration of spacers or ununiformity in distribution density may cause a problem that the gap between the substrate is non-uniform.

To overcome the above drawbacks, it is proposed to form columnar spacers in predetermined portions of an array substrate by a photolithography process.

Since a columnar spacer is liable to form an alignment defect region therearound, it may lower the image quality. Therefore, the columnar spacers are generally formed in a shield area of the display area. In order to prevent the aperture ratio from lowering or to achieve high definition, the shield area of the display area is restricted as small as possible. Therefore, it is preferable that the columnar spacer be as small as possible; however, if the columnar spacer is small, the process margin will be lowered. Thus, it is difficult both to prevent the manufacture yield from lowering and to improve the display performance.

BRIEF SUMMARY OF THE INVENTION

The present invention has been developed to eliminate the above drawbacks, and its object is to provide a flat panel display device and a method for manufacturing the same, in which the display performance is high and the manufacturing yield is prevented from lowering.

According to an aspect of the present invention, there is provided a flat panel display device comprising:
a pair of substrates facing each other;
a spacer, made of photosensitive material, for providing a gap between the pair of substrates; and
a display medium arranged in the gap,
at least one of the pair of substrates having a lightproof region including a linear portion, and the spacer being arranged in the linear portion and having a shape a longitudinal axis of which extends along the linear portion and which has a recessed portion narrower than the linear portion.

According to another aspect of the present invention, there is provided a flat panel display device comprising:
a pair of substrates facing each other;
a spacer, made of photosensitive material, for providing a gap between the pair of substrates; and
a display medium arranged in the gap,
the spacer having a recessed portion in a plan view.

According to still another aspect of the present invention, there is provided a method for manufacturing a flat panel display device comprising the steps of:
forming a photosensitive spacer material on a first substrate;
exposing the spacer material using a mask having a predetermined pattern and developing the exposed spacer material; and
adhering the first substrate to a second substrate,
the mask having the predetermined pattern for exposing the spacer material to a shape having a recessed portion in a plan view.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A flat panel display device according to an embodiment of the present invention, i.e., a liquid crystal display device of an active matrix type, will be described with reference to the accompanying drawings.

Figure 2:
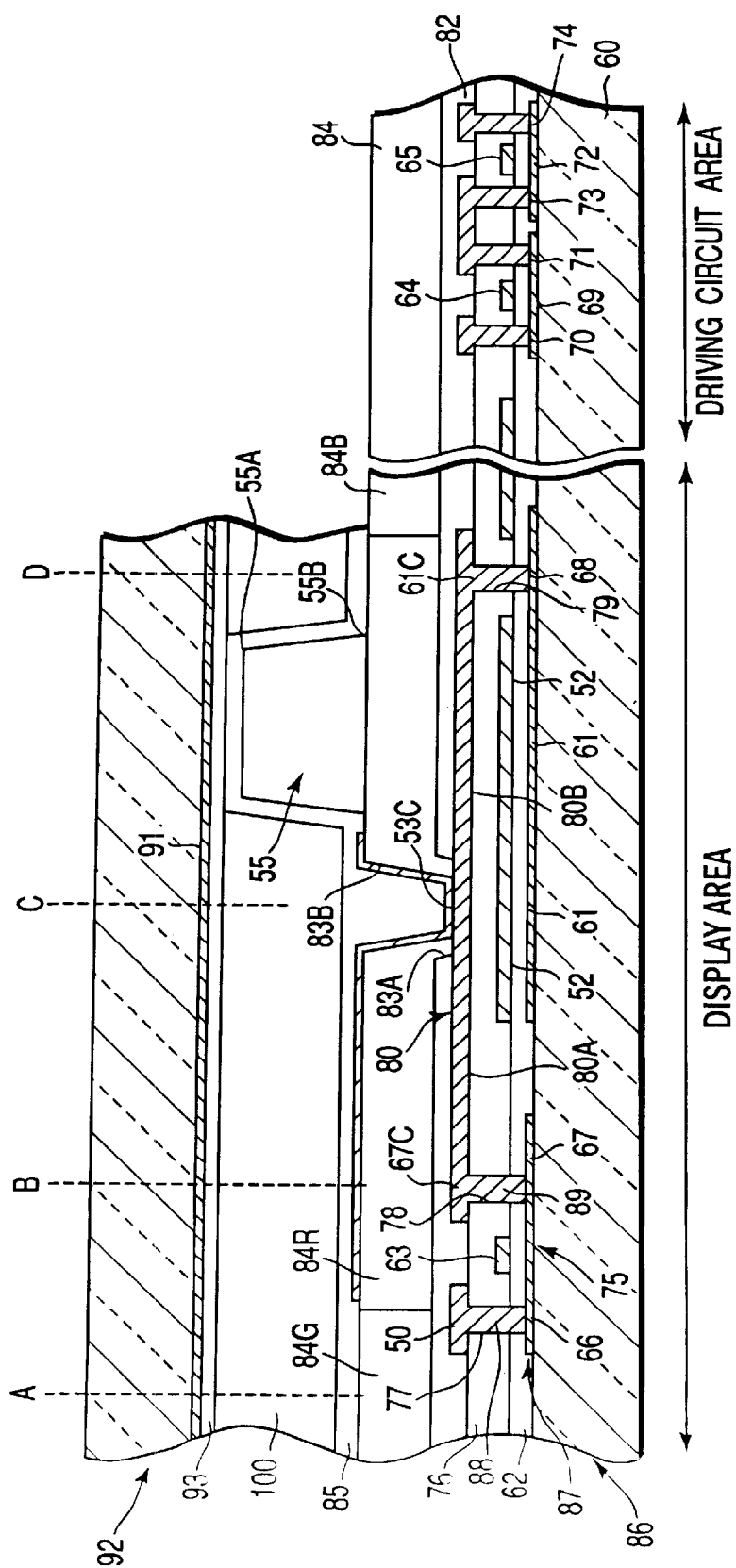
FIG. 2 is a schematic cross-sectional view of the liquid crystal display device taken along the dot-chain line A—B—C—D in FIG. 1.

As shown in FIG. 2, the liquid crystal display device comprises an array substrate 86, a counter substrate 92 opposing to the array substrate 86 with a predetermined distance therebetween, and a liquid crystal layer 100 containing a liquid crystal component and serving as a display medium. The liquid crystal layer 100 is held in a gap between the array substrate 86 and the counter substrate 92.

Figure 1:
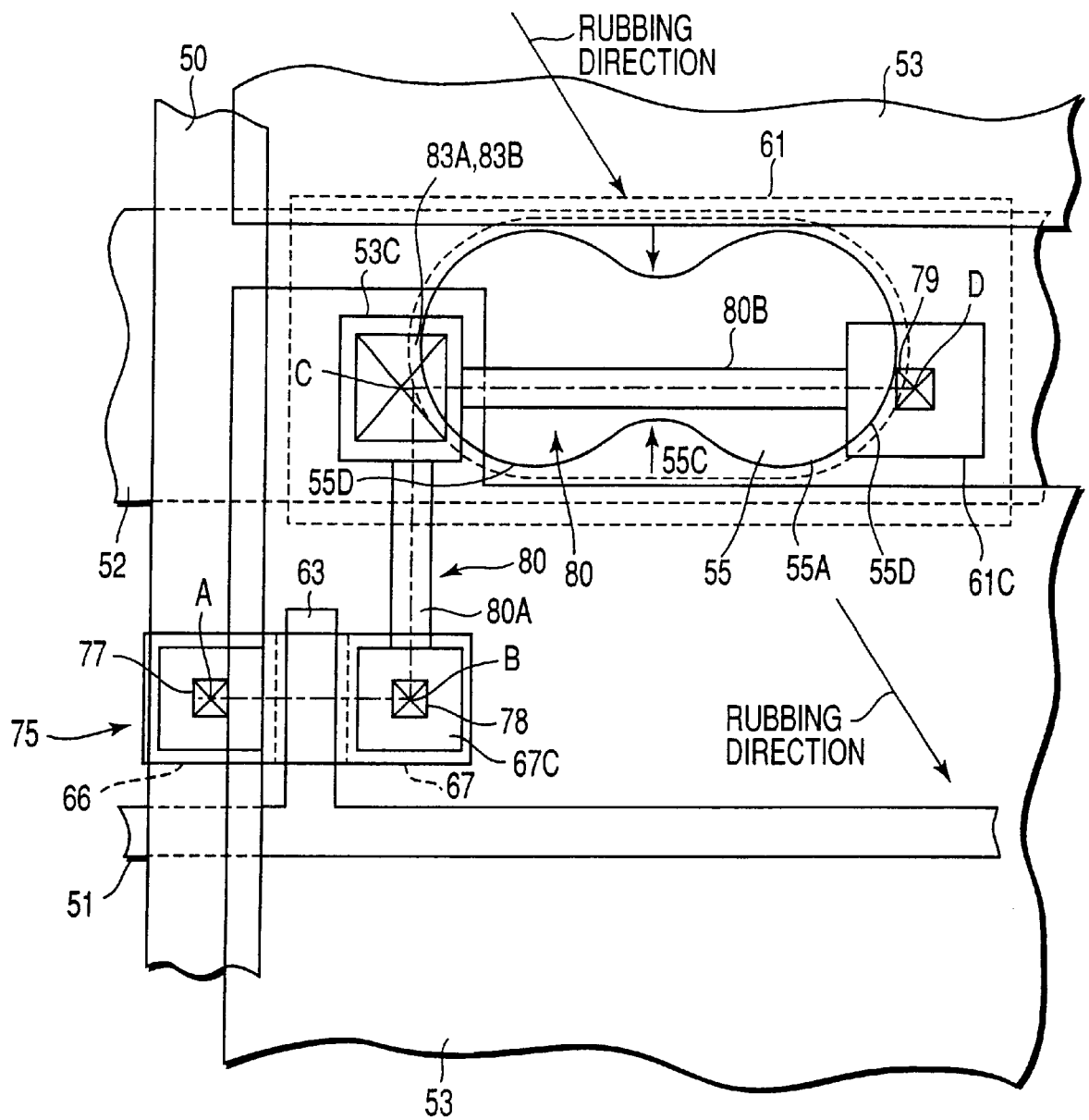
FIG. 1 is a schematic horizontal cross-sectional view through a liquid crystal layer showing a pixel region of a flat panel display device according to an embodiment of the present invention, i.e., a liquid crystal display device of an active matrix type.

The array substrate 86, as shown in FIGS. 1 and 2, includes an m×n-number of pixel electrodes 53 arranged in a matrix, an m-number of scanning lines 51 extending along the row direction of the pixel electrodes 53, an n-number of signal lines 50 extending in the column direction of the pixel electrodes 53, and an m×n-number of thin film transistors 75 corresponding to the m×n-number of pixel electrodes 53. The thin film transistors 75 are located near the intersections between the respective scanning lines 51 and signal lines 50 and serve as non-linear switching elements.

The counter substrate 92 has a counter electrode 91 opposing to the pixel electrodes 53 and setting to a reference potential and an alignment film 93 covering the counter electrode 91. The counter electrode 91 is made of indium tin oxide (ITO), i.e., a transparent conductive material. The pixel electrode 53, the counter electrode 91 and the liquid crystal layer 100 interposed therebetween form a liquid crystal capacitance CL.

The array substrate 86 has a plurality of storage capacitance elements, or a pair of electrodes, for forming storage capacitance CS electrically parallel with the liquid crystal capacitance CL. In other words, the pixel electrode 53, a storage capacitance electrode 61, and a storage capacitance line 52 form the storage capacitance CS. The storage capacitance electrode 61 has the same potential as that of the pixel electrode 53. The storage capacitance line 52 sets to a predetermined potential.

As shown in FIGS. 1 and 2, in a pixel region of the array substrate 86, a signal line 50 is arranged perpendicular to the scanning line 51 and the storage capacitance line 52 via an interlayer insulating film 76. The storage capacitance line 52 is formed in the same layer as the scanning line 51 and parallel to the scanning line 51. A part of the storage capacitance line 52 is opposed via a gate insulating film 62 to the storage capacitance electrode 61, which is formed of a polysilicon film doped with an impurity.

Wiring portions, including the signal line 50, the scanning line 51 and the storage capacitance line 52, are made of low-resistance, lightproof material, such as aluminum and molybdenum-tungsten.

The pixel electrode 53 is arranged such that the peripheral portions thereof overlap the signal line 50 and the storage capacitance line 52. The pixel electrode 53 is made of ITO, i.e., a transparent conductive material. The thin film transistor (pixel TFT) 75, serving as a switching element, is arranged near the intersection between the signal line 50 and the scanning line 51.

The pixel TFT 75 includes a semiconductor layer 87 formed on the same layer as the storage capacitance electrode 61. The semiconductor layer 87 is made of a polysilicon film doped with an impurity, as is the storage capacitance electrode 61. The semiconductor layer 87 has a drain region 66 and a source region 67.

The pixel TFT 75 also includes a gate electrode 63 formed integral with the scanning line 51 and located above the semiconductor layer 87 with the gate insulating film 62 interposed therebetween. A drain electrode 88 is brought into contact with the drain region 66 through a contact hole 77 passing through the gate insulating film 62 and the interlayer insulating film 76, and electrically connected to the signal line 50. A source electrode 89 is electrically connected to the source region 67 through a contact hole 78 passing through the gate insulating film 62 and the interlayer insulating film 76.

The interlayer insulating film 76 formed in the array substrate 86 is covered by a protecting insulating film 82. Color filter layers 84 (R, G, B) respectively colored with red (R), green (G) and blue (B) are formed on the protecting insulating film 82 in the pixel regions. The pixel electrode 53 is formed on the color filter layers 84.

An alignment film 85 is provided on the array substrate 86 to cover the pixel electrode 53.

As shown in FIGS. 1 and 2, an interconnecting wire 80 is electrically connected to the source electrode 89 of the pixel TFT 75, the pixel electrode 53 and the storage capacitance electrode 61.

More specifically, the source electrode 89 is electrically connected to a first contact electrode 67C through the contact hole 78. The pixel electrode 53 is electrically connected to a second contact electrode 53C through a contact hole 83A passing through the protecting insulating film 82 and a contact hole 83B passing through the color filter layer 84. The storage capacitance electrode 61 is electrically connected to a third contact electrode 61C through a contact hole 79 passing through the interlayer insulating film 76 and the gate insulating film 62.

The first contact electrode 67C and the second contact electrode 53C are electrically connected by a first interconnecting portion 80A of the interconnecting wire 80. As a result, the first interconnecting portion 80A electrically connects the source electrode 89 and the pixel electrode 53.

The second contact electrode 53C and the third contact electrode 61C are electrically connected by a second interconnecting portion B0B of the interconnecting wire 80. As a result, the second interconnecting portion B0B electrically connects the pixel electrode 53 and the storage capacitance electrode 61. The second interconnecting portion 80B is continuous to the first interconnecting portion 80A.

With the above structure, the source electrode 89 of the TFT 75, the pixel electrode 53 and the storage capacitance electrode 61 have the same potential.

Columnar spacers 55, which are colored, are formed on the lightproof wiring portions, such as the storage capacitance line 52, on a main plane of the array substrate 86. The columnar spaces 55 are formed of photosensitive carbonless black resin containing pigment.

To both save the space and increase the process margin, each columnar spacer 55 formed on the main plane of the array substrate 86 has such a shape as shown in FIG. 1. Specifically, the columnar spacer 55 has a recessed portion 55C curved inwardly from the edges extending along the longitudinal direction of the wiring portion (the storage capacitance line 52), so that the spacer cannot project into the pixel region (in the top view) from the wiring portion.

With the spacer having the above shape, the area which supports the substrates is enlarged and the process margin is increased without lowering the aperture ratio of the pixel region as compared to the case of a spacer having a circular shape.

In an annealing step of the process of manufacturing the columnar spacer 55, a portion having a relatively large radius of curvature may be expanded by melt. Therefore, in the case where the columnar spacer 55 extends along the longitudinal direction of the wiring portion, a central portion of the columnar spacer 55 may be expanded in the width direction of the wiring. To suppress the expansion, the recessed portion 55C is formed in the central portion of the columnar spacer 55.

With this shape, since the radius of curvature can be small, the expansion due to melt can be suppressed as compared to the conventional spacer. In addition, even if the columnar spacer is somewhat expanded, it will not reach to the pixel region.

A method for manufacturing the active matrix liquid crystal display device having the above structure will now be described with reference to FIGS. 1 and 2.

First, an amorphous silicon film (a-Si film) is deposited on a transparent insulating substrate 60, e.g., a glass substrate or quartz substrate, to a thickness of about 50 nm by CVD (chemical-vapor deposition) or the like. Then, a dehydrogenation process is performed by annealing the substrate at 450° C. for an hour. Thereafter, an excimer laser beam is radiated on the a-Si film, so that the a-Si film can be polycrystallized. The polycrystallized silicon film, i.e., the polysilicon film, is patterned by photoengraving, thereby forming a channel layer of the pixel TFT 75 to be formed in the pixel region of the display area, channel layers of an N-channel circuit TFT 69 and a P-channel circuit TFT 72 to be formed in a driving circuit area, and a storage capacitance electrode 61.

Subsequently, a silicon oxide film (SiOx film) is deposited on the overall surface of the substrate 60 to a thickness of about 100 nm by CVD, thereby forming the gate insulating film 62.

Then, a film of tantalum (Ta), chromium (Cr), aluminum (Al), molybdenum (Mo), tungsten (W) and copper (Cu), a laminated film of at least two of these metals, or a film of an alloy thereof, such as Mo—W alloy, is deposited on the overall surface of the gate insulating film 62 to a thickness of about 400 nm. The resultant metal film is patterned to a predetermined shape by photoengraving, thereby forming the scanning line 51, the storage capacitance line 52 opposing to the storage capacitance electrode 61 with the gate insulating film 62 interposed therebetween, the gate electrode 63 of the pixel TFT 75 extended from the scanning line 51, the gate electrodes 64 and 65 of the circuit TFTs 69 and 72, and other various wires in the driving circuit area.

Thereafter, an impurity is injected into the channel layers (polysilicon film) by ion implantation or ion doping, using the gate electrodes 63, 64 and 65 as masks, thereby forming the drain region 66 and the source region 67 of the pixel TFT 75, a contact region 68 of the storage capacitance electrode 61, a source region 70 and a drain region 71 of the N-channel circuit TFT 69. In this embodiment, for example, $PH_3/H_2$ is doped as an impurity under the conditions of the acceleration voltage of 80 KeV and the dose of $5\times10^{15}$ atoms/cm$^2$, so that phosphorus can be doped in high concentration.

Then, the pixel TFT 75, and the N-channel circuit TFT 69 in the driving circuit region are covered with resist so that an impurity cannot be doped therein. Thereafter, an impurity is doped into the channel layers (polysilicon film) by ion implantation or ion doping, using the gate electrode 64 of the P-channel circuit TFT 72 as a mask, thereby forming a source region 73 and a drain region 74 of the circuit TFT 72. In this embodiment, for example, $B_2H_6/H_2$ is doped as an impurity under the conditions of the acceleration voltage of 80 KeV and the dose of $5\times10^{15}$ atoms/cm$^2$, so that boron can be doped in high concentration.

Subsequently, an impurity is doped into the polysilicon films to form an N-channel LDD (lightly doped drain) region in the pixel TFT 75 and the circuit TFT 69. Then, the overall substrate is annealed, thereby activating the impurity.

Thereafter, a silicon oxide ($SiO_2$) film is deposited on the overall surface of the substrate 60 to a thickness of about 500 nm, thereby forming the interlayer insulating film 76.

Thereafter, the contact hole 77 leading to the drain region 66 of the pixel TFT 75, the contact hole 78 leading to the source region 67, the contact hole 79 reading to the contact region 68 of the storage capacitance electrode 61, and contact holes leading to the source regions 70 and 73 and the drain regions 71 and 74 of the circuit TFTs 69 and 72 are formed in the gate insulating film 62 and the interlayer insulating film 76 by photoengraving.

Subsequently, a film of Ta, Cr, Al, Mo, W and Cu, a laminated film of at least two of these metals, or a film of an alloy thereof, such as Al—Mo alloy, is deposited on the overall surface to a thickness of about 500 nm. The resultant metal film is patterned to a predetermined shape by photoengraving.

As a result, the signal line 50 and the drain electrode 88 in contact with the drain region 66 of the pixel TFT 75 are formed. At the same time, the source electrode 89 in contact with the source region 67 of the pixel TFT 75, the first contact electrode 67C electrically connected to the source electrode 89, the second contact electrode 53C to be electrically connected to the pixel electrode 53 formed later, and the third contact electrode 61C electrically connected to the storage capacitance electrode 61 are formed. In addition, at the same time, the first interconnecting portion 80A for electrically connecting the first and second contact electrodes 67C and 53C and the second interconnecting portion 80B for electrically connecting the second and third contact electrodes 53C and 61C are formed. Thus, the interconnecting wire 80 is formed. Further, at the same time, various wires of the circuit TFTs 69 and 72 in the driving circuit area are formed.

The first contact electrode 67C, the first interconnecting portion 80A, the second contact electrode 53C, the second interconnecting portion 80B and the second contact electrode 61C are formed as a unitary one piece structure, constituting the interconnecting wire 80.

Then, a silicon nitride film (SiNx) is formed on the overall surface of the substrate 60, thereby forming the protecting insulating film 82. The contact hole 83A leading to the second contact electrode 53C is formed in the protecting insulating film 82 by photoengraving.

Subsequently, the color filter layers 84R, 84G and 84B, in which red, blue and green pigments are dispersed, are formed in the respective pixel regions to a thickness of about 3 μm. The contact hole 83B leading to the second contact electrode 53C is formed in each color filter layer 84 by photoengraving.

Thereafter, a transparent conductive film, for example, indium tin oxide (ITO) is deposited on the overall surface to a thickness of about 100 nm by sputtering. The transparent conductive film is patterned to a predetermined shape by photoengraving. As a result, the pixel electrode 53 is formed. At the same time, the pixel electrode 53 and the second contact electrode 53C are electrically connected, and the source electrode 67 of the pixel TFT 75 and the pixel electrode 53 are electrically connected by the first interconnecting portion 80A of the inter-connecting wire 80.

Then, photosensitive carbonless black resin containing black pigment of a particle size of 0.05 to 0.2 μm is applied to the surface of the substrate to a thickness of 6 μm by a spinner. After the applied resin is dried for 10 minutes at 90° C., it is exposed by a wavelength of 365 nm at an amount of exposure of 500 mJ/cm$^2$, using a photomask of a predetermined shape. Then, it is developed by an alkaline aqueous solution having a pH 11.5, thereby forming a column. The column is heated to 220° C. at a rate of 200° C./min, so that it is melted. The temperature is maintained for 60 minutes, so that the column is completely cured.

As a result, a lightproof columnar spacer 55 of a thickness of about 5 μm is formed at a predetermined position of the lightproof wiring portion (the storage capacitance line 52). As described before with reference to FIG. 1, the columnar spacer 55 has the recessed portion 55C curved inwardly from the edges of the storage capacitance line 52. Therefore, in the process of forming the columnar space 55, it is less expanded by melt. Even if it is expanded, the spacer is prevented from projecting into the pixel region.

Figure 3A:
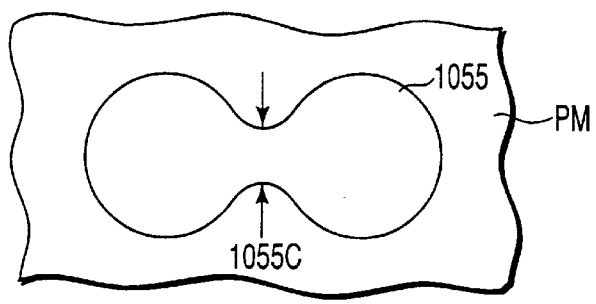
FIGS. 3A to 3C are horizontal cross-sectional schematic diagrams showing a part of a photomask having a mask pattern for forming a columnar spacer applied to a liquid crystal display device.
Figure 3B:
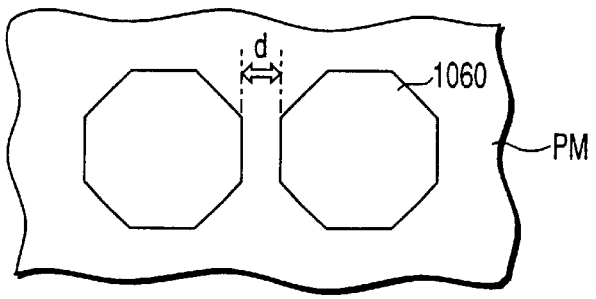
Figure 3C:
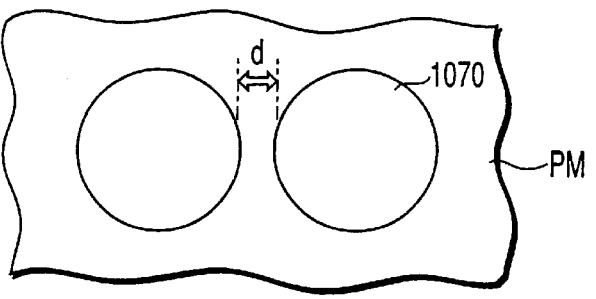

A photomask PM for forming the aforementioned shape of the spacer may have a pattern, for example, as shown in FIG. 3A. The photomask PM has an opening 1055 having a narrow portion 1055C corresponding to the recessed portion 55C of the columnar spacer 55. Alternatively, the photomask PM for forming the columnar spacer may have a pattern as shown in FIG. 3B, in which regular polygonal, for example, octagonal openings 1060 are arranged at a distance smaller than the exposure resolution. Further, the photomask PM for forming the columnar spacer may have a pattern as shown in FIG. 3C, in which perfect circular openings 1070 are arranged at a distance smaller than the exposure resolution. The shape of the openings formed in the photomask is not limited to a regular polygon or a perfect circle, but may be any other shape, or a combination of a plurality of shapes.

Subsequent to the step described above, a material of an alignment film is applied to the overall surface of the substrate to a thickness of 500D. The material is annealed and then rubbed, thereby forming the alignment film 85.

The array substrate 86 of the active matrix liquid crystal display device is obtained through the steps as has been described above.

The counter substrate 92 having the counter electrode 91 and the alignment film 93 are formed on a transparent insulating substrate 90.

Then, adhesive is printed on the overall periphery of the alignment film 93 of the counter substrate 92 except for a liquid crystal injecting port. Electrode transfer material for applying a voltage from the array substrate 86 to the counter electrode 91 is provided on transfer electrodes around the adhesive.

Subsequently, the array substrate 86 and the counter substrate 92 are arranged such that the respective alignment films 85 and 93 face each other and the rubbing directions of the alignment films form an angle of 90°. The substrates are heated to cure the adhesive, with the result that they are adhered to each other.

Then, after a liquid crystal composition is injected through the liquid crystal injecting port, the liquid crystal injecting port is sealed with ultraviolet-curable resin.

The active matrix liquid crystal display device is obtained through the above steps.

According to the liquid crystal display device having the above structure, in the process of forming the columnar spacer 55, expansion in diameter of the spacer due to melt is suppressed. Therefore, the columnar spacer 55 does not enter the pixel region, thereby preventing the display performance from lowering. Even if the alignment near the columnar spacer 55 is disturbed, the degradation of the image quality due to leakage of light can be suppressed, since the columnar spacer 55 is arranged on the lightproof wiring portion.

Further, since the columnar spacer 55 has the * recessed portion narrower than the wiring portion, the area of a support surface 55A which supports the substrates is enlarged and the process margin is increased as compared to the case of a spacer having a circular shape. Therefore, the manufacturing yield is prevented from being reduced.

In the embodiment described above, the array substrate 86 has the color filter layers 84. However, the present invention can be applied to a liquid crystal display device in which color filter layers are formed in the counter substrate 92.

Further, in the embodiment described above, the columnar spacer is arranged on the storage capacitance line serving as a wiring portion. However, it may be arranged on another wiring portion, i.e., the scanning line or the signal line.

Furthermore, in the embodiment described above, the supporting surface 55A of the columnar spacer 55 is formed of two arc portions 55D and two inwardly-curved portions 55C on the main plane of the array substrate, as shown in FIG. 1. However, the supporting surface is not limited to this shape.

Figure 4:
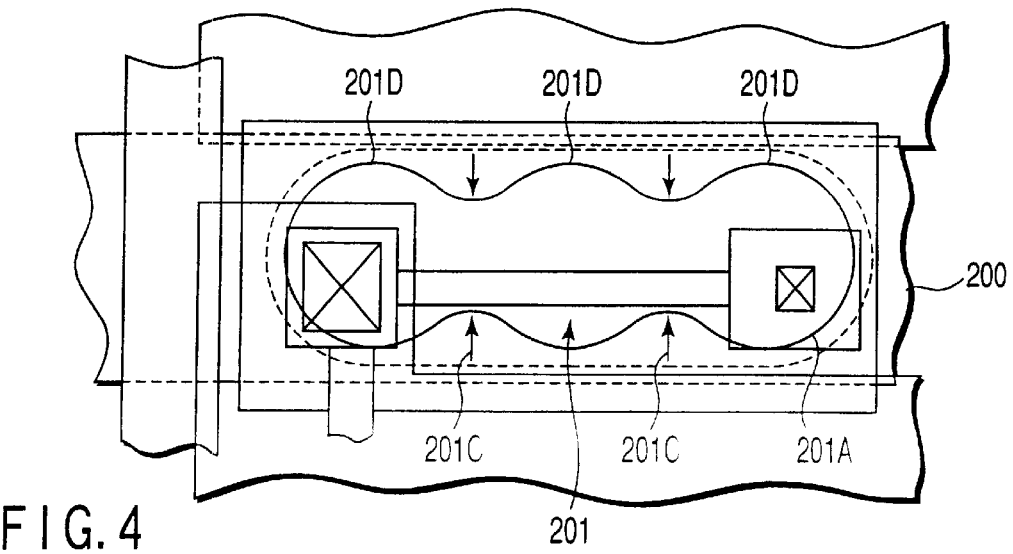
FIGS. 4, 5, 6 and 7 are schematic horizontal cross-sectional views through a liquid crystal layer showing columnar spacers of different shapes applicable to the liquid crystal display device.

For example, a columnar spacer 201 having a supporting surface 201A as shown in FIG. 4 may be arranged on a wiring portion 200. The supporting surface 201A is formed of four arc portions 201D and four inwardly-curved portions 201C.

Figure 5:
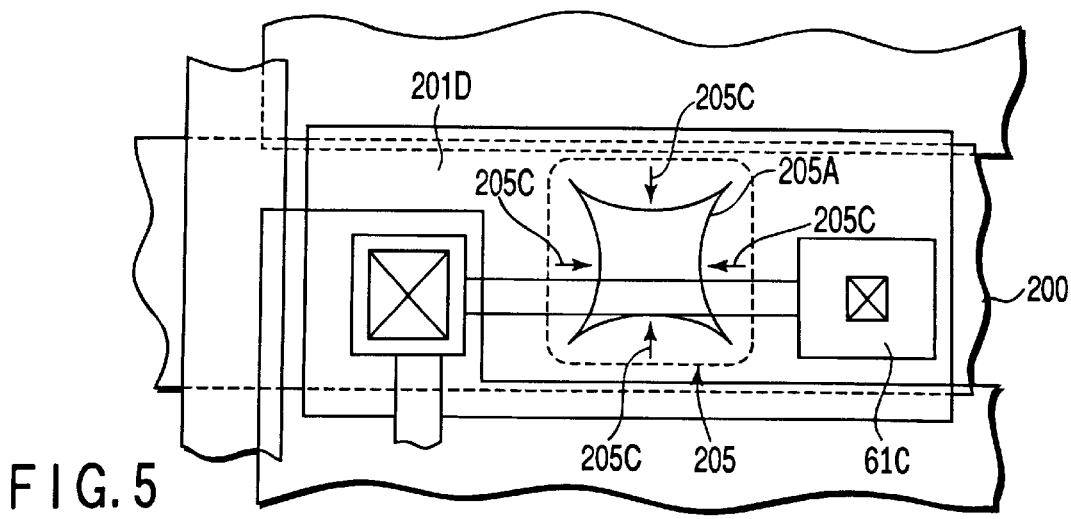

Alternatively, a columnar spacer 205 having a supporting surface 205A as shown in FIG. 5 may be arranged on the wiring portion 200. The supporting surface 205A is formed of four inwardly-curved portions 205C.

Figure 6:
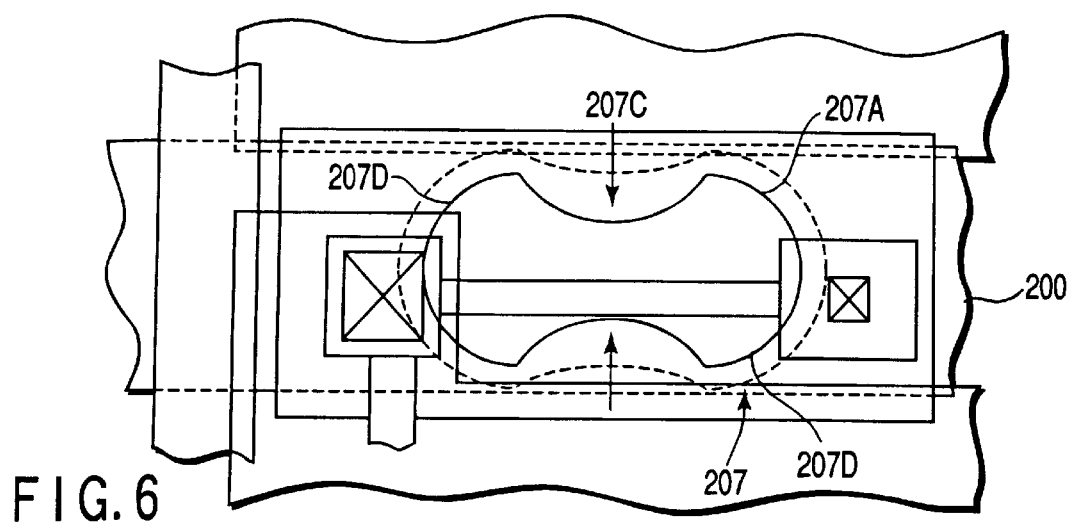

As another modification, a columnar spacer 207 having a supporting surface 207A as shown in FIG. 6 may be arranged on the wiring portion 200. The supporting surface 207A is formed of two arc portions 207D and two inwardly-curved arc portions 207C.

Figure 7:
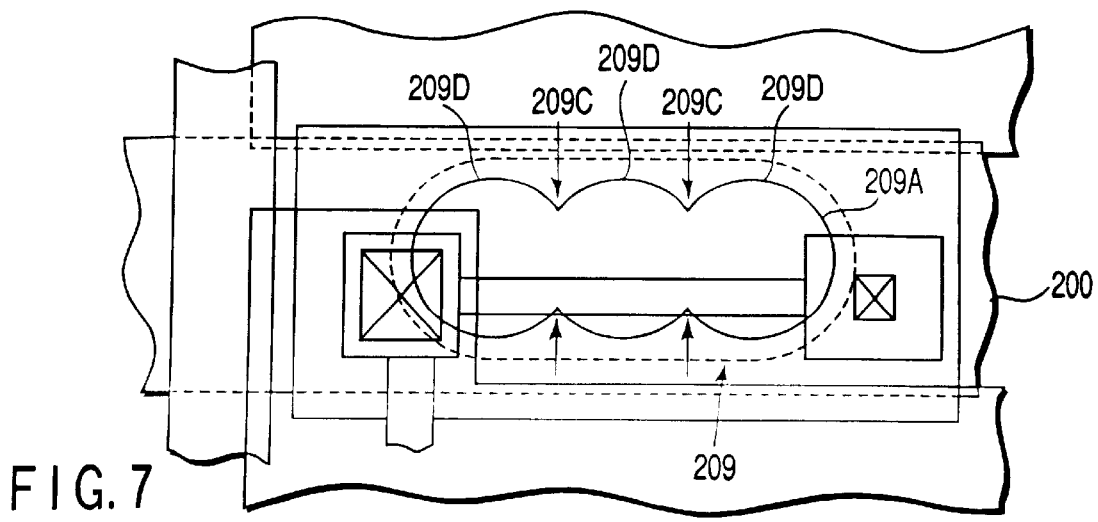

As still another modification, a columnar spacer 209 having a supporting surface 209A as shown in FIG. 7 may be arranged on a wiring portion 200. The supporting surface 207A is formed of four arc portions 209D and four inwardly-curved portions 209C at the connecting portion between the adjacent arcs.

With the spacer 201, 205, 207 and 209 as described above, as in the case of the above embodiment, the display performance is prevented from lowering, the area of the support surface is enlarged and the process margin is increased. Therefore, the manufacturing yield is prevented from being reduced.

As has been described above, the present invention can provide a flat panel display device and a method for manufacturing the same, in which the display performance is high and the manufacturing yield is prevented from lowering.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flat panel display device comprising:
   a pair of substrates facing each other;
   a spacer, made of photosensitive material, for providing a gap between the pair of substrates; and
   a display medium arranged in the gap,
   at least one of the pair of substrates having a lightproof region including a linear portion, and the spacer being arranged in the linear portion and having a shape a longitudinal axis of which extends along the linear portion and which has a recessed portion in a horizontal cross-sectional view along with one of the pair of substrates narrower than the linear portion.

2. A flat panel display device according to claim 1, wherein the one of the pair of substrates is an array substrate including a wiring portion and a switching element, and the lightproof region is the wiring portion.

3. A flat panel display device according to claim 2, wherein the array substrate has a pixel electrode for driving the display medium, and the wiring portion is a storage capacitance line for forming a storage capacitance between the pixel electrode and the wiring portion.

4. A flat panel display device according to claim 1, wherein the spacer is colored.

5. A flat panel display device comprising:

a pair of substrates facing each other;

a spacer, made of photosensitive material, for providing a gap between the pair of substrates the spacer having a recessed portion in a horizontal cross-sectional view along with one of the pair of substrates; and a display medium arranged in the gap, wherein the spacer is black.

6. A flat panel display device comprising:

a pair of substrates facing each other;

a spacer, made of photosensitive material, for providing a gap between the pair of substrates; and a display medium arranged in the gap, the spacer having a recessed portion in a horizontal cross-sectional view along with one of the pair of substrates.

7. A method for manufacturing a flat panel display device comprising the steps of:

forming a photosensitive spacer material on a first substrate; exposing the spacer material using a mask having a predetermined pattern and developing the exposed spacer material; and adhering the first substrate to a second substrate, the mask having the predetermined pattern for exposing the spacer material to a shape having a recessed portion in a horizontal cross-sectional view along with the first substrate or the second substrate.

8. A method for manufacturing a flat panel display device according to claim 7, wherein the predetermined pattern has a narrow portion corresponding to the recessed portion of the spacer.

9. A method for manufacturing a flat panel display device according to claim 7, wherein the predetermined pattern comprises a plurality of polygonal patterns or a plurality of circular patterns arranged at a distance smaller than an exposure resolution.

* * * * *